United States Patent
Wehner

[11] Patent Number: 6,133,870
[45] Date of Patent: Oct. 17, 2000

[54] EPHEMERIS DETERMINATION USING INTERSATELLITE RANGING AND EPHEMERIS KNOWLEDGE OF OTHER SATELLITES

[75] Inventor: James W. Wehner, Torrance, Calif.

[73] Assignee: TRW Inc., Redondo Beach, Calif.

[21] Appl. No.: 09/342,846

[22] Filed: Jun. 29, 1999

[51] Int. Cl.⁷ .............................. G01S 5/02; H04B 7/185
[52] U.S. Cl. .............................. 342/357.01; 342/357.06; 701/226
[58] Field of Search ............................. 342/357.01, 352, 342/357.06; 701/213, 225, 226

[56] References Cited

U.S. PATENT DOCUMENTS

| 5,451,964 | 9/1995 | Babu | 342/357 |
| 5,523,763 | 6/1996 | Loomis | 342/357 |
| 5,621,646 | 4/1997 | Enge et al. | 364/449 |
| 5,978,735 | 11/1999 | Gu | 701/213 |
| 6,009,376 | 12/1999 | Brodie et al. | 701/226 |
| 6,011,509 | 1/2000 | Dutka | 342/357.06 |

*Primary Examiner*—Thomas H. Tarcza
*Assistant Examiner*—Dao L. Phan
*Attorney, Agent, or Firm*—Michael S. Yatsko

[57] ABSTRACT

The present invention provides a system (200) for determining the ephemeris of a space vehicle based on distances to and ephemeris of other spacecraft. An ephemeris determining subsystem (300) obtains ephemeris data (308) for one or more reference spacecraft. Distance information (306) is obtained between the space vehicle and the reference spacecraft. The spacecraft ephemeris (312) is then calculated with ephemeris determination algorithms (302) based on the ephemeris data (308) and distance information (306). Other available information, such as stored results of previous measurements and calculations, time (310), information from other on-board sensors and attitude information may be used to enhance the accuracy or decrease the complexity of the ephemeris determination.

23 Claims, 6 Drawing Sheets

EPHEMERIS DETERMINATION USING INTERSATELLITE RANGING AND EPHEMERIS KNOWLEDGE OF OTHER SATELLITES

CROSS-REFERENCE TO RELATED APPLICATIONS

This application is related to TRW Docket No. 11-1000 titled "Ephemeris/Attitude Reference Determination Using Communications Links", filed herewith and TRW Docket No. 11-0999 titled "Ephemeris/Attitude Reference Determination Using On-board Optics and Other Satellite Ephemeris", filed herewith.

BACKGROUND OF THE INVENTION

The present invention generally relates to spacecraft ephemeris determination. More specifically, the present invention relates to utilizing ranging information and ephemeris of other spacecraft to determine spacecraft ephemeris.

Orbit determination and control are important aspects of most satellite systems. The guidance and navigation function, also known as the Orbit Determination and Control Subsystem (hereinafter "ODCS"), measures and maintains the position of the spacecraft's center of mass. The position (and optionally the velocity) of a spacecraft as a function of time is commonly referred to as the spacecraft ephemeris. The ODCS determines the spacecraft's position in space using sensors. External references must be used to determine the absolute position of the spacecraft. The external references may include the Sun, the Earth's infrared horizon, magnetic fields, and the stars.

Next, the ODCS must control the orbital position of the spacecraft using actuators, such as gas jets or thrusters. The ODCS deals with spacecraft dynamics and has the multiple functions of acquisition, determination, maintenance, and maneuver control. Orbital control is needed whenever a satellite is trying to achieve a desired orbit. Orbital control is also needed to overcome orbit perturbations to achieve altitude maintenance in Low-Earth Orbit (hereinafter "LEO") or geosynchronous stationkeeping. Maintaining relative satellite positions, such as in constellation maintenance, also requires orbital control.

Navigation has two basic purposes. As just mentioned, navigation provides the information necessary to maintain and control an orbit, just as attitude determination provides the information necessary for attitude control. Thus, a requirement for orbit control will ordinarily result in a corresponding requirement for navigation. Navigation information may also be used in processing data from the payload.

Irrespective of orbit control, there is often a need to point an antenna or instrument in some direction to perform communication or observation tasks. For example, in satellite systems designed to track objects, knowledge of the positions of the satellites sensing the objects being tracked may be critical. Since the position of an object being tracked is ultimately derived from the position in space of the satellite(s) sensing the object, the accuracy of the tracking is directly dependent upon the accuracy with which the position of the satellite(s) is known.

In an ideal setting, ephemeris would always be as expected and there would be no need for complex and expensive determination and control subsystems. In reality, however, forces act on the satellite to move it away from the nominal orbit. There are short-period orbital variations (also known as "perturbations") that are periodic with a period less than or equal to the orbital period, and there are long-period perturbations, which are orbital variations with a period greater than the orbital period. There are also secular variations, which represent a linear orbital variation that increases over time. The primary forces that perturb a satellite orbit arise from third bodies such as the Sun and the Moon, the non-spherical mass distribution of the Earth, atmospheric drag, and solar radiation pressure.

In the past, guidance and navigation have involved intense ground-operation activity. However, on-board computers have become computationally powerful, lightweight, and energy efficient. Satellites now carry advanced on-board computers and are capable of performing autonomous navigation. Another important factor enabling a move to autonomous navigation is the development of accurate on-board sensors, such as Navstar. The principal problem remaining is that of providing the on-board computers with ephemeris data from a source that is reliable, robust, and economical in terms of both cost and weight.

Many autonomous navigation methods currently exist. For example, the Microcosm Autonomous Navigation System uses observations of the Earth, Sun, and Moon, and determines orbit, attitude, ground look point, and Sun direction. Its typically accuracy is approximately 100 m–400 m in a LEO system. Another navigational aid is the Space Sextant, which uses the angle between particular stars and the Moon's limb. The space sextant determines both orbit and attitude, and its typical accuracy is 250 m. Stellar refraction is another navigation system and uses the refraction of starlight passing through the atmosphere to determine both orbit and attitude. Its typical accuracy is 150 m–100 m. Yet another system is Landmark Tracking, which makes use of angular measurements of landmarks to determine both orbit and attitude. Its typical accuracy is measured in kilometers.

Possibly the most popular navigational system is Navstar, also known as the Global Positioning System (hereinafter "GPS"), which uses a network of navigation satellites. GPS is currently operational and primarily used for the determination of orbital information. However, attitude determination using GPS and multiple GPS antennas has been proposed. The positional accuracy obtainable from GPS is in the 15 m to 150 m range depending on whether the system is using military or commercial grade data. GPS receivers receive signals from four GPS satellites and use the received information to solve simultaneously for the three components of the observer's position and the current time. This calculation can be made several times, providing position and velocity information, which is in turn used to determine orbital parameters. The GPS constellation is at approximately half-geosynchronous altitude and works best for LEO satellites. Since GPS is operationally proven and at least as accurate as other known navigational systems, it is commonly used.

However, two significant problems with GPS are reliability and cost. The potential lack of availability of the GPS satellites for even a short period, due to either geometrical circumstances, the failure of one of more of the GPS satellites, or the failure of the on-board GPS receiver is a major concern for an expensive spacecraft which depends on GPS for attitude and positional determination. In addition, space grade GPS receivers can be prohibitively expensive, particularly when it is noted that critical satellite systems in need of accurate positional data may employ redundant GPS receivers on-board each satellite. The additional expense of a redundant GPS receiver, particularly to each satellite in a constellation potentially comprising dozens of satellites with limited lifespans, is substantial. Furthermore, there is a need for a method and apparatus which would effectively serve as a backup to an expensive primary navigational system such as GPS.

A need has long existed for an improved satellite ephemeris determination system.

SUMMARY OF THE INVENTION

It is an object of the present invention to provide an ephemeris determination system which utilizes existing satellite subsystems.

It is another object of the present invention to provide an ephemeris determination system which utilizes existing satellite subsystems and inherent characteristics of satellite communication networks.

It is a further object of the present invention to provide an ephemeris determination system which determines the ephemeris for a spacecraft based on the ephemeris of reference spacecraft.

It is yet another object of the present invention to provide an ephemeris determination system which determines the ephemeris for a spacecraft based on the ephemeris of reference spacecraft and measured distances to the reference spacecraft.

One or more of the foregoing objects is met in whole or in part by a preferred embodiment of the present invention that provides a method and apparatus for the determination of the ephemeris of a space vehicle. For ephemeris determination, reference ephemeris information for reference spacecraft is obtained. The reference ephemeris information is preferably received directly from reference spacecraft crosslinked to the space vehicle. Distances between the space vehicle and the reference spacecraft are determined, preferably through the use of direct distance determining subsystems, such as RADAR, or by measuring signal propagation delays in systems utilizing bent-pipe transponders. Ephemeris determination algorithms then calculate the space vehicle's ephemeris based on the reference ephemeris information, distance information, and preferably time information. The Ephemeris determination algorithms preferably employ Kalman filtering and associated ephemeris propagation.

DETAILED DESCRIPTION OF THE PREFERRED EMBODIMENT

Figure 1:
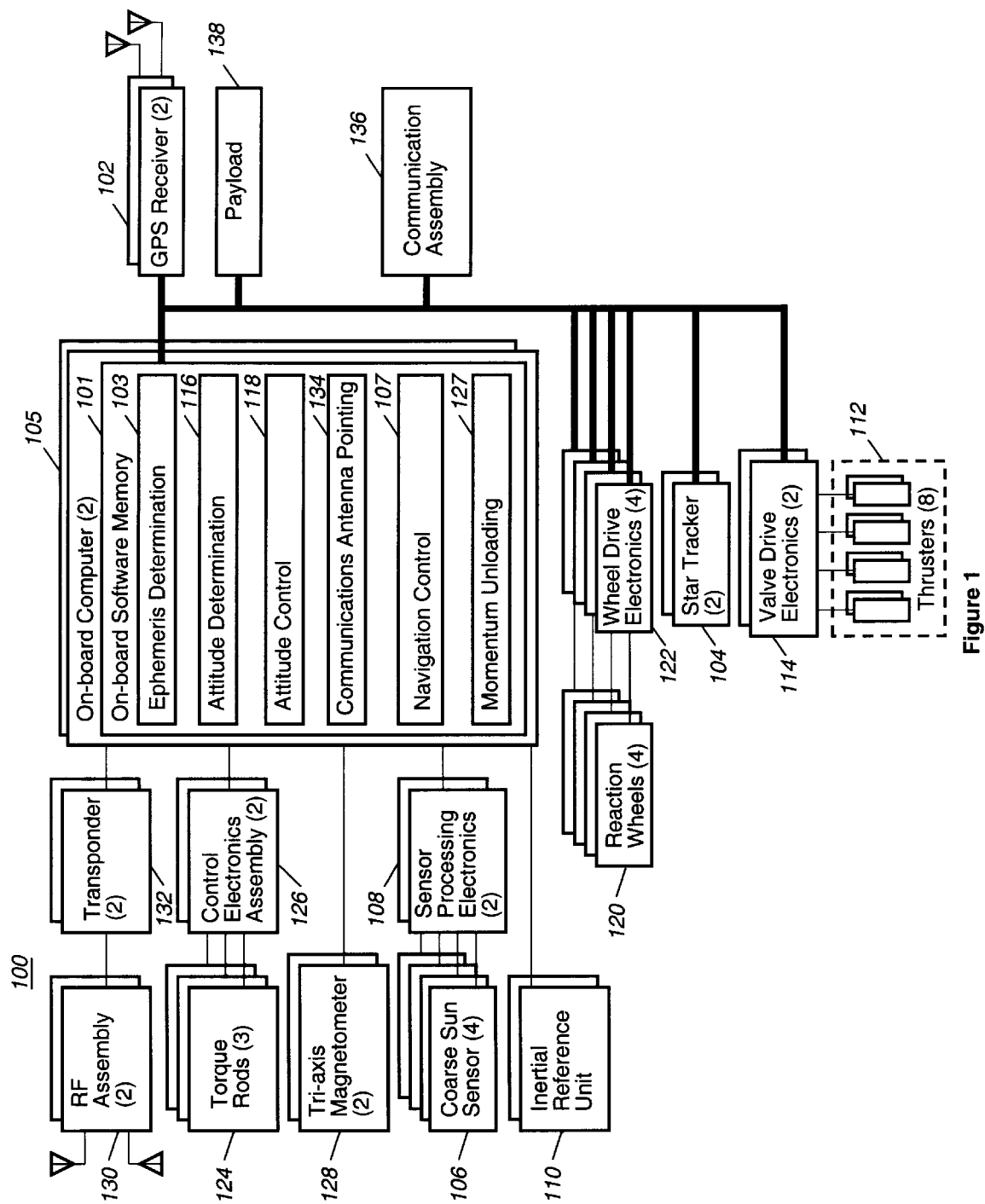
FIG. 1 illustrates an on-board satellite system with redundant GPS receivers.

FIG. 1 illustrates a block diagram of a typical on-board satellite system 100. The satellite system 100 includes ephemeris determination components which determine the orbital position for the satellite system 100 as a function of time. The satellite system 100 acquires its ephemeris information from a pair of GPS receivers 102, one of which is redundant. One of the motivations underlying the present invention is to reduce the need for prohibitively expensive space grade GPS receivers, thereby generating substantial cost savings.

The on-board ephemeris determination software 103 resides in a memory 101 coupled to the on-board computer (or processor) 105 and is provided to monitor the ephemeris and propagate the ephemeris between GPS readings. Once the ephemeris has been determined, it is sent to the navigation control software 107, which compares the determined ephemeris to the desired ephemeris. If necessary, adjustments to the orbit are made using the thrusters 112 and their control circuitry 114.

The satellite system 100 also includes attitude reference determination components that determine the attitude of the spacecraft. The satellite system 100 illustrated in FIG. 1 may, for example, include a star tracker 104 for attitude reference determination. Coarse sun sensors 106 and accompanying sensor processing electronics 108 may also be included for coarse attitude reference determination and are typically used when a spacecraft is too unstable for more accurate sensors, such as the star tracker 104, to function properly.

In order to propagate attitude between sensor readings, or when access to the stars is not available, an inertial reference unit 110 (e.g. a gyro) is included. The inertial reference unit 110 and star tracker 104 are linked to on-board attitude determination software 116. The attitude determination software 116 determines and tracks attitude, propagates attitude between sensor readings, and provides attitude information to the attitude control software 118. In turn, the attitude control software 118 sends signals to the attitude control hardware which executes the desired attitude adjustments. The attitude control hardware for the satellite system 100 illustrated in FIG. 1 includes reaction wheels 120 and their associated wheel drive electronics 122. Accelerating and decelerating the reaction wheels 120 induces torques on the satellite body due to conservation of angular momentum. The induced torques, in turn, cause the satellite body to rotate in the desired directions.

During its lifetime, the satellite is exposed to attitude perturbing torques. The torques may be due to solar pressure, atmospheric drag, gravity gradient, the Earth's magnetic field, and other causes. As noted above, the attitude control system compensates for these torques using the reaction wheels 120. However, if the torques do not average out over time, the angular velocity of the reaction wheels 120 will continually increase. Eventually, the angular velocity of the reaction wheels 120 may exceed some maximum limit. Momentum unloading components are typically provided to address this concern.

For example, the satellite system 100 may include torque rods 124 and their respective control assembly electronics 126 which act in conjunction with the Earth's magnetic field to impart torques on the spacecraft. A magnetometer 128 is used to sense the Earth's magnetic field. Momentum unloading software 127 then controls currents in the torque rods 124 to generate compensating torques, which in turn result in the attitude control system slowing down the reaction wheels 120.

An omni-directional RF assembly 130 and a transponder 132 are provided to enable communication with the spacecraft regardless of the satellite attitude and/or orientation. A directional communication assembly 136 is preferably provided for maintaining crosslinks to other spacecraft and/or uplinks and downlinks to earth stations. The communications antenna pointing software 134 controls the pointing of crosslinks and/or uplinks and downlinks.

Figure 2:
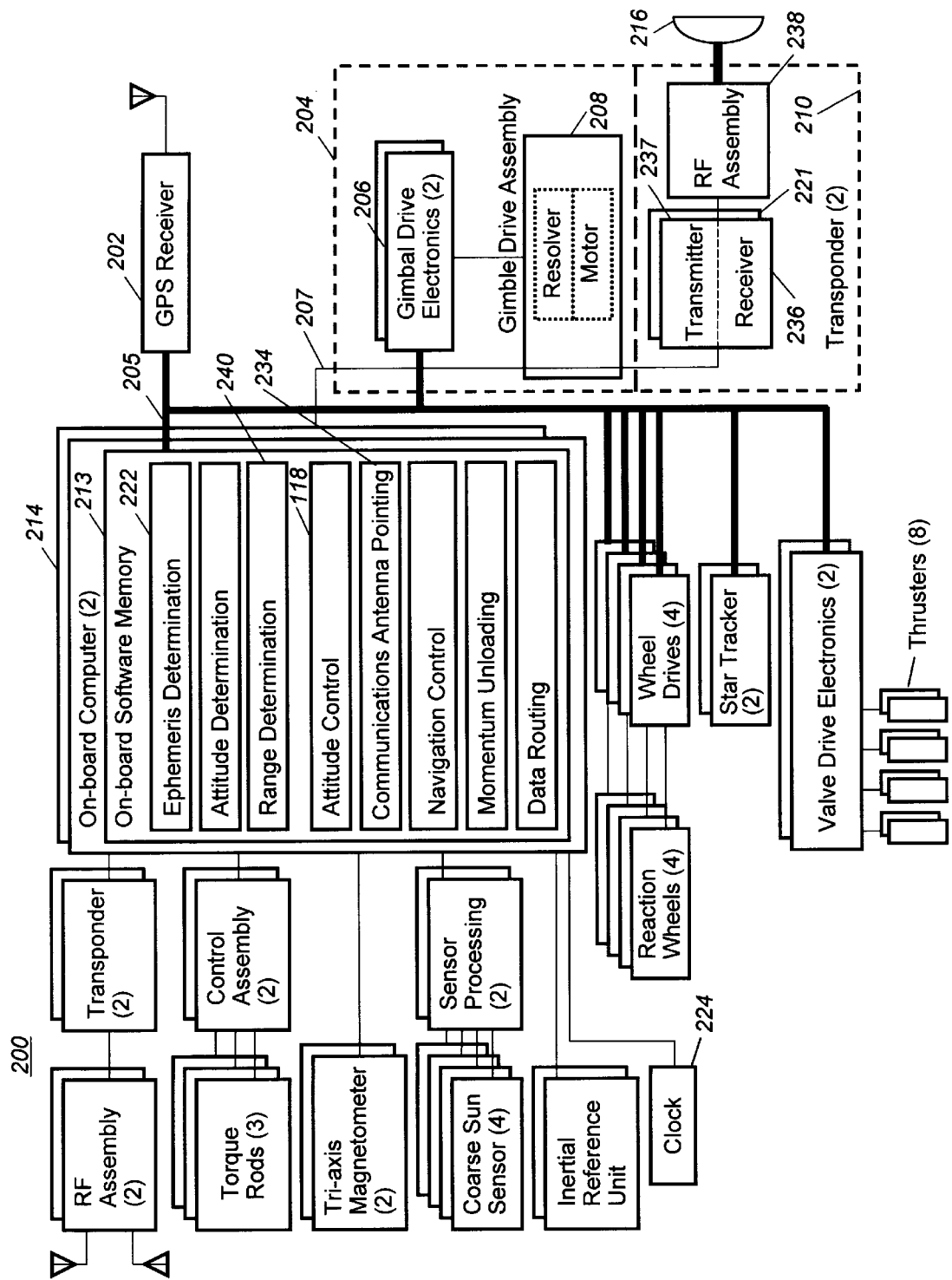
FIG. 2 illustrates a satellite system incorporating an ephemeris determination subsystem according to a preferred embodiment of the present invention.

FIG. 2 illustrates a satellite system 200 incorporating an ephemeris determination subsystem according to a preferred embodiment of the present invention. A single GPS receiver 202, rather than a redundant pair, is utilized for primary ephemeris determination. The back-up ephemeris determination subsystem utilizes knowledge of the ephemeris of other spacecraft and distances to those other spacecraft to determine the ephemeris of the satellite. A GPS failure would effectively render useless the GPS receiver 202. Therefore, another mechanism for determining satellite ephemeris utilizing the remaining functional components on-board the satellite is required. Optionally, information from a functional GPS receiver 202 could be used to augment ephemeris determinations made by an ephemeris determination system according to the present invention. The embodiment in FIG. 2 shares many common components with FIG. 1, and are therefore not relabeled.

In one embodiment, the communications antenna pointing software 234 resides in a memory 213 coupled to a computer (or processor) 214. A bidirectional communication assembly 204 is coupled to the computer 214 by a command and control data bus 205. The bidirectional communication assembly 204 includes gimbal drive electronics 206, a gimbal drive assembly 208, and a transmit/receive assembly 210. The computer 214 sends pointing commands to the gimbal drive electronics 206, which in turn, drives the gimbal drive assembly 208, which is attached to the transmit/receive assembly 210. The transmit/receive assembly 210 contains a directional antenna 216 for communicating with reference spacecraft. The communications antenna pointing software 234 sends commands to the gimbal drive electronics 206 to point the transmit/receive assembly 210 toward reference spacecraft.

A transponder 221 in the transmit/receive assembly 210 is provided to receive ephemeris information for the reference spacecraft. The transponder 221 preferably contains a receiver 236 capable of receiving reference spacecraft ephemeris information from other spacecraft via crosslinks or from earth stations via uplinks. The receiver 236 preferably demodulates the received ephemeris information and provides reference spacecraft ephemeris data to the computer 214 via a dedicated data bus 207.

Ideally this communication link to reference spacecraft performs both communication and ranging with standard ranging techniques using a bent-pipe approach and relying on signal timing delays to determine relative distance. The transponder 221 preferably includes a transmitter 237 to generate a ranging signal, which is sent out through the RF assembly 238 and directional antenna 216 to reference spacecraft. The reference spacecraft, typically using bent-pipe transponders, return the ranging signal to the satellite system 200. The returned ranging signal(s) travels through the directional antenna 216 and RF assembly 238 to the receiver 236. The transponder 221 then sends data corresponding to the returned ranging signal to ranging and determination software 240 over the dedicated data bus 207. The range determination software 240 than determines the relative range(s) to the reference spacecraft using previously known and measured signal time delay information.

The ephemeris determination software 222 resides in the memory 213 coupled to the computer 214. The computer 214 preferably receives reference spacecraft distance and ephemeris data from the transmit/receive assembly 210. Ephemeris determination instructions in the ephemeris determination software 222 determine the satellite ephemeris by acting on the reference spacecraft distance data and the reference spacecraft ephemeris data. The ephemeris determination software 222 may, for example, determine the ephemeris of the satellite using established trigonometric identities. Alternately, ground processing may be used instead of the on-board processing description herein.

The ephemeris determination software 222 may determine ephemeris by considering reference spacecraft ephemeris and reference spacecraft distance data at multiple points in time. A system clock 224 is therefore provided which sends time data to the computer 214. The time data may then be incorporated into the ephemeris determination.

The ephemeris determination system for a space vehicle according to a preferred embodiment of the present invention need not be the only functioning ephemeris determination system for the space vehicle. Ephemeris information for the space vehicle may be received from an external entity, such as a ground station, or from an independent ephemeris reference subsystem on-board the space vehicle. Such independent ephemeris reference subsystems may reside on the space vehicle but act independently from the preferred embodiment and may include, for example, an on-board GPS-based ephemeris reference system. The ephemeris reference information for the space vehicle may then be used by the ephemeris determination software 222 for comparison to or averaging with its own ephemeris determination.

In an alternate embodiment of the present invention, the satellite system 200 uses a dedicated ranging system, such as a RADAR system, for distance determination. The dedicated ranging system, in turn, supplies reference spacecraft ranging information to the on-board computer 214 where the range determination software 240 processes the reference spacecraft ranging information. The ephemeris determination software then determines the ephemeris for the spacecraft 200, as explained previously.

Figure 3:
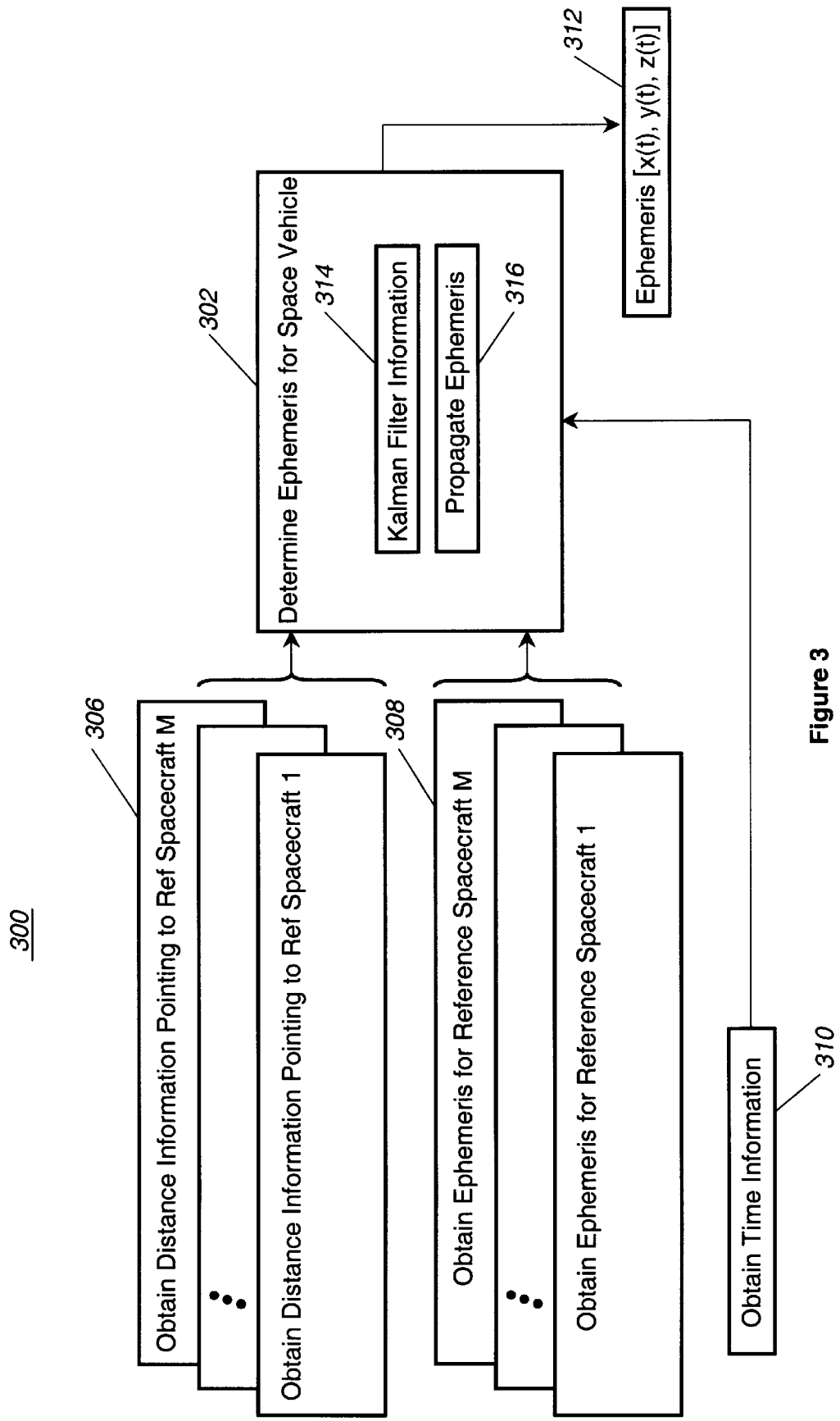
FIG. 3 illustrates ephemeris determination according to a preferred embodiment of the present invention.

FIG. 3 illustrates a space vehicle ephemeris determination process 300 according to a preferred embodiment of the present invention. Reference spacecraft distance information 306 is obtained and provided for ephemeris determination 302. The distance or ranging) information 306 may be obtained from a source (or sources) external to the space vehicle, such as ground stations or the reference spacecraft. The distance information is preferably obtained from subsystems on-board the space vehicle, such as RADAR subsystems, LASER or other optical subsystems, and subsystems which measure signal propagation times in bent-pipe communication systems. In addition, ephemeris information for each reference spacecraft is obtained at step 308 and provided for ephemeris determination 302. Time information 310 is also preferably obtained and provided for ephemeris determination at step 302. The ephemeris determination step 302 then determines the ephemeris for the space vehicle based on the input information obtained and provided in steps 306, 308 and 310.

The ephemeris determination step 302 preferably includes a Kalman filtering step 314 so that past information and determinations can be used to increase the fidelity of the current ephemeris determination. In addition, the ephemeris determination step 302 preferably contains an ephemeris propagating step 316, including gravitational modeling, for the propagation of space vehicle ephemeris between external inputs and optionally for the propagation of the ephemeris of reference spacecraft. The result of the ephemeris determination step 302 includes the determined ephemeris 312 for the spacecraft.

Figure 4A:
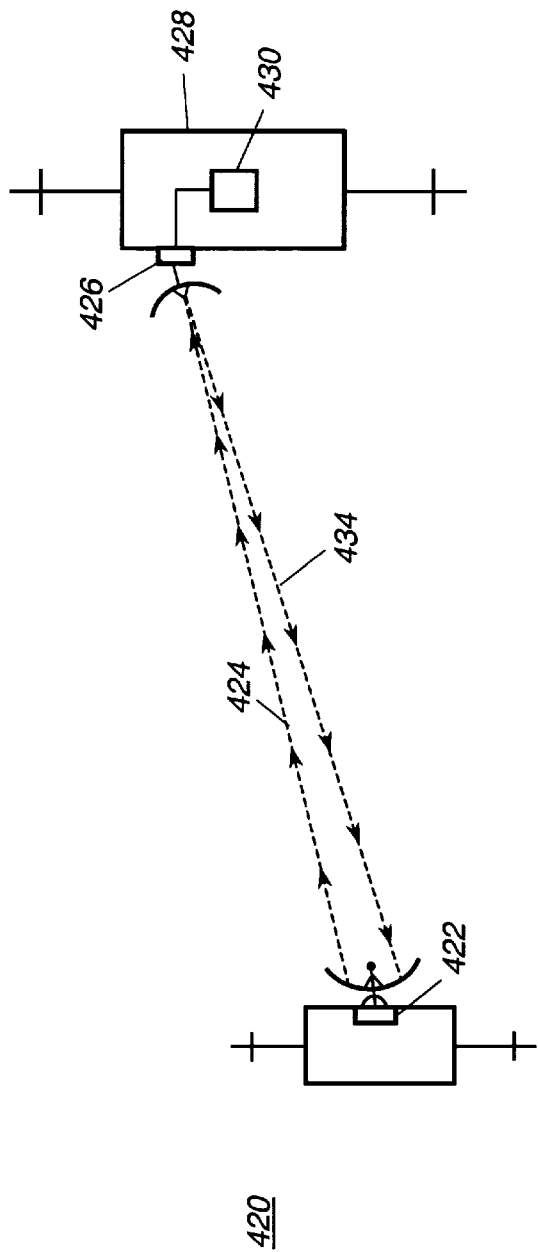
FIG. 4A shows a diagram illustrating reference spacecraft distance determination according to a preferred embodiment of the present invention.

FIG. 4A shows a space vehicle 420 utilizing reference spacecraft distance determination according to a preferred embodiment of the present invention. A communication assembly 422 transmits a radio signal 424 which arrives at the transmit/receive assembly 426 of the reference spacecraft 428. A bent-pipe transponder assembly 430 at the reference spacecraft 428 prepares the received signal 424 for retransmission, and the transmit/receive assembly 426 relays a signal 434 back to the space vehicle 420 where the relayed signal 434 is received by the communication assembly 422. By measuring the propagation delay of the radio signal round trip (424, 426, 430, 426 and 434) and considering the known delay of the reference spacecraft transmit/receive assembly 426 and bent-pipe transponder 430, the distance between the space vehicle 420 and the reference spacecraft 428 may be determined.

Figure 4B:
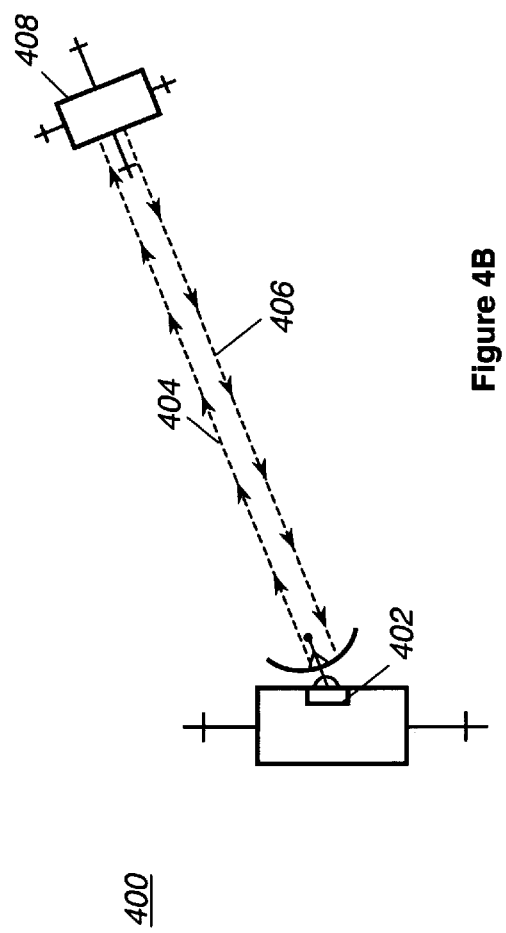
FIG. 4B shows a diagram illustrating reference spacecraft distance determination according to an alternative embodiment of the present invention.

Turning to FIG. 4B, that figure shows a space vehicle 400 utilizing reference spacecraft distance determination according to an alternate embodiment of the present invention. A RADAR assembly 402 transmits a RADAR signal 404 which reflects off of a reference spacecraft 408 resulting in a return signal 406 which arrives back at the RADAR assembly 402. By measuring the propagation delay of the RADAR signal round trip (404 and 406), the distance between the space vehicle 400 and the reference spacecraft 408 may be determined. Two such distance measurements at a known time interval may be used to determine relative velocity magnitude (or speed) between the space vehicle 400 and the reference spacecraft 408. In addition, a doppler type RADAR subsystem may be used to detect relative velocity between the space vehicle 400 and the reference spacecraft 408.

Figure 5:
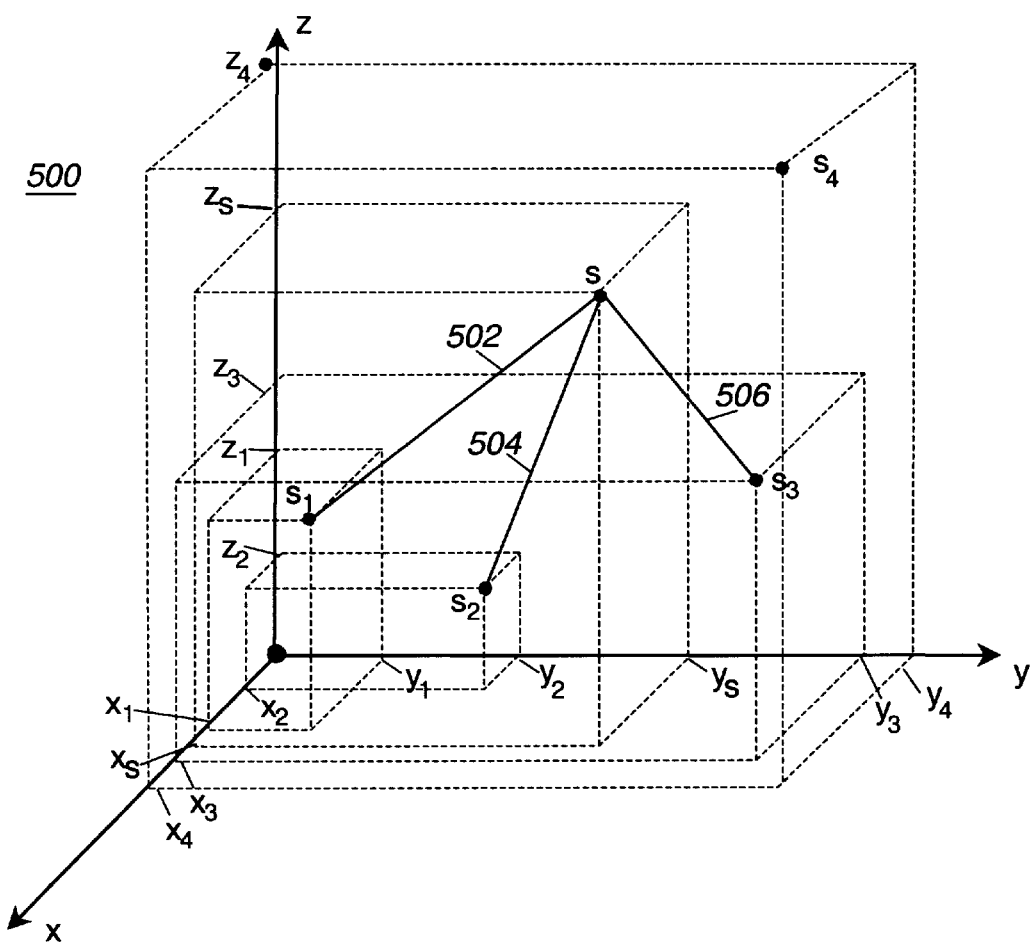
FIG. 5 depicts a three-dimensional space diagram illustrating an ephemeris determination scenario.

FIG. 5 illustrates an ephemeris determination scenario in three-dimensional space 500 involving a spacecraft S with three reference distances (502, 504 and 506) to three reference spacecraft (S1, S2 and S3 respectively). The spacecraft S knows the ephemeris for each of the reference spacecraft (S1, S2 and S3) at a point in time, either through receiving the ephemeris information directly or propagating the ephemeris information between updates. The spacecraft also knows the distances (502, 504 and 506) to the three reference spacecraft (S1, S2 and S3, respectively). The spacecraft S may thus solve for its location using established trigonometric relationships. Multiple location determinations over time may then be used to determine the velocity of the spacecraft S.

Knowledge of the ephemeris of the first reference spacecraft S1 and the distance between the space vehicle S and the first reference spacecraft S1 at a point in time effectively defines a first sphere in three-dimensional space. Knowledge of the ephemeris of the second reference spacecraft S2 and the distance between the space vehicle S and the second reference spacecraft S2 at the point in time effectively defines a second sphere in three-dimensional space. The intersection of the first sphere and the second sphere define a circle. Knowledge of the ephemeris of the third reference spacecraft S3 and the distance between the space vehicle S and the third reference spacecraft S3 at the point in time effectively defines a third sphere in three dimensional space. The intersection of the third sphere with the circle defined by the intersection of the first and second spheres defines two points in three-dimensional space. A fourth reference distance measurement could be used to define a single point in space, or alternatively other knowledge may be used, such as ephemeris propagation for the space vehicle S between measurements or knowledge of the approximate distance between the space vehicle and Earth or other natural celestial bodies or multiple measurements at different times of the same spacecraft. In instances where ephemeris determinations are made using ranging measurements to reference spacecraft at multiple points in time, state equations may be used in combination with ephemeris propagation for the reference spacecraft, to help resolve the spacecraft S position.

For ephemeris determination according to the preferred invention, it is only necessary to know the ephemeris of at least one reference spacecraft and distances between the reference spacecraft and the space vehicle. However, additional information, such as the space vehicle's altitude above the earth, the space vehicle's attitude, sensed positions of other bodies, such as the Earth, and GPS data may be used to increase the fidelity of the ephemeris calculation.

Figure 6:
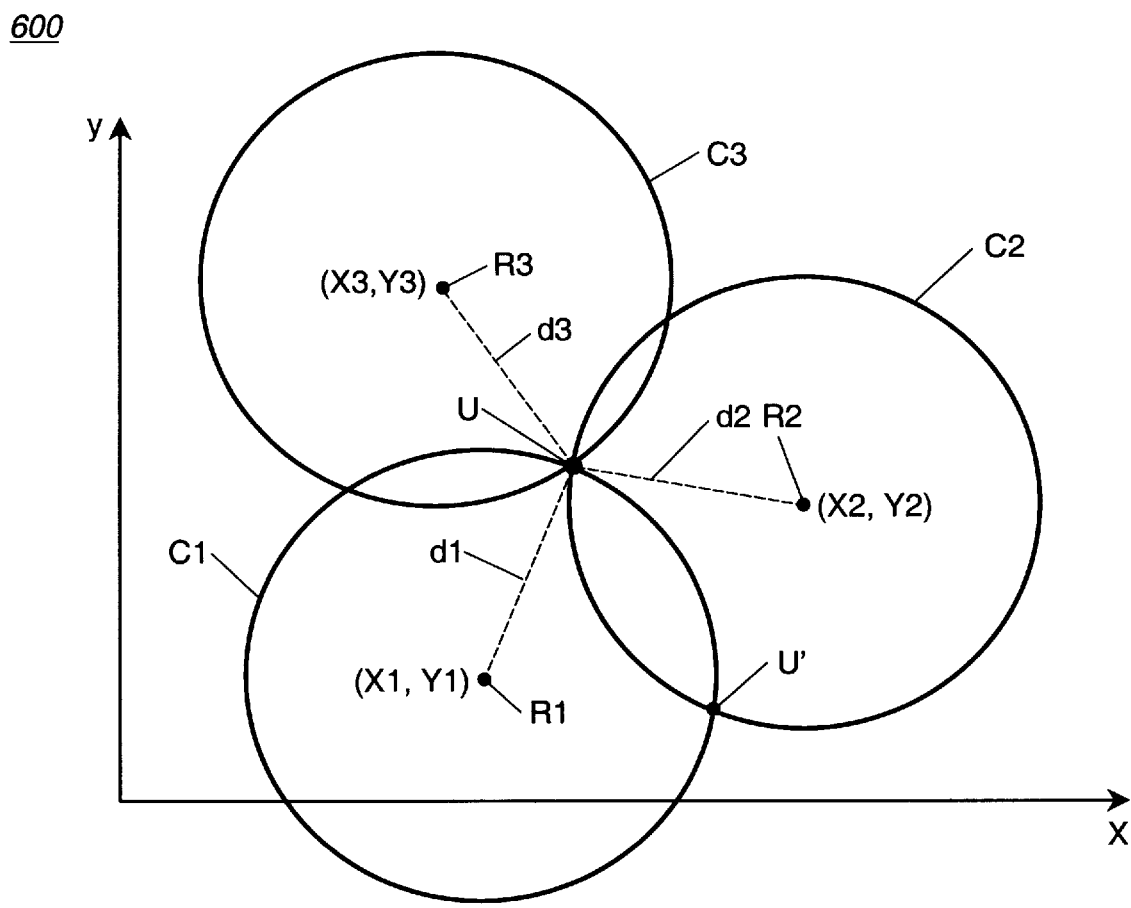
FIG. 6 shows a two-dimensional space diagram illustrating an ephemeris determination scenario.

To provide a reduced complexity two-dimensional explanation of ephemeris determination according to an embodiment of the present invention, FIG. 6 shows a two-dimensional space 600 and ephemeris determination situation.

Initially, the space vehicle U determines the distance d1 between itself and the first reference spacecraft R1. The space vehicle U also obtains the ephemeris, comprising the position (X1, Y1), for the first reference spacecraft R1 at a point in time. Thus, the space vehicle U is able to define a circle C1 in two-dimensional space centered on the first reference spacecraft R1 and passing through the position of the space vehicle U. The space vehicle U then determines the distance d2 between itself U and a second reference spacecraft R2. The space vehicle U also obtains the ephemeris, comprising the position (X2, Y2), for the second reference spacecraft R2 at the point in time. Thus, the space vehicle U is able to define a circle C2 in two-dimensional space centered on the second reference spacecraft R2 and passing through the position of the space vehicle U. The two circles (C1, C2) intersect at two points U, U'.

For this example, the space vehicle U then determines the distance d3 between itself U and a third reference spacecraft R3. The space vehicle U also obtains the ephemeris, comprising the position (X3, Y3), for the third reference spacecraft R3 at the point in time. Thus, the space vehicle U is able to define a circle C3 in two-dimensional space centered on the third reference spacecraft R3 and passing through the position of the space vehicle U. The three circles (C1, C2 and C3) intersect at one point U, which can be solved for by on-board ephemeris determination software using established mathematical identities. Additional distance d4 and ephemeris information (X4, Y4) may be used in a similar fashion for a fourth reference spacecraft R4 to check or increase the fidelity of the ephemeris determination. For example, in the scenario illustrated in FIG. 6, the first three circles C1, C2, C3 may not perfectly intersect at space vehicle U. A statistical best fit may me used to estimate the position of space vehicle U. The statistical best fit may be enhanced by the addition of information regarding a fourth circle C4. Positional information determined at different points in time may be used to determine velocity information for the space vehicle U.

The method and apparatus of the present invention utilizes reference spacecraft distance and ephemeris to determine ephemeris for a space vehicle. The present invention provides a low-cost alternative to expensive spacecraft ephemeris determination subsystems (e.g., GPS). The present invention can either serve as a primary ephemeris determination subsystem or as a secondary subsystem. The ephemeris information produced by the present invention may also be used to augment ephemeris information obtained from other sources, thereby increasing the accuracy of ephemeris determinations.

While particular elements, embodiments and applications of the present invention have been shown and described, it will be understood that the invention is not limited thereto since modifications may be made by those skilled in the art, particularly in light of the foregoing teachings. It is therefore contemplated by the appended claims to cover such modifications as incorporate those features which come within the spirit and scope of the invention.

What is claimed is:

1. A method for determining ephemeris for a space vehicle, the method comprising:

determining reference distances between the space vehicle and at least one reference spacecraft;

obtaining reference ephemeris information for the reference spacecraft; and determining ephemeris for the space vehicle based on the reference distances and the reference ephemeris information.

2. The method of claim 1, wherein said step of determining reference distances comprises determining reference distances to a plurality of reference spacecraft.

3. The method of claim 1, wherein said step of determining reference distances comprises determining reference distances to three reference spacecraft.

4. The method of claim 1, wherein said step of determining reference distances comprises measuring delay for communications between the space vehicle and the reference spacecraft.

5. The method of claim 1, wherein said step of determining reference distances comprises measuring the reference distances using RADAR.

6. The method of claim 1, wherein said step of determining reference distances comprises optically measuring the reference distances.

7. The method of claim 1, wherein said step of determining reference distances comprises receiving the reference distances from a source external to the space vehicle.

8. The method of claim 1, wherein said step of obtaining reference ephemeris information comprises receiving the reference ephemeris information from the reference spacecraft.

9. The method of claim 1, wherein said step of obtaining reference ephemeris information for the space vehicle comprises receiving the reference ephemeris information from at least one ground station.

10. The method of claim 1, wherein said step of determining ephemeris for the space vehicle comprises propagating ephemeris for the reference spacecraft between reference ephemeris updates.

11. The method of claim 1, further comprising obtaining time information, and wherein said step of determining reference distances comprises determining the reference distances at a plurality of points in time, and wherein said step of obtaining reference information comprises obtaining reference ephemeris information for the reference spacecraft at a plurality of points in time, and wherein said step of determining ephemeris for the space vehicle comprises determining ephemeris for the space vehicle further based on the time information.

12. The method of claim 11, wherein said step of determining ephemeris for the space vehicle comprises Kalman filtering at least one of the group consisting of the reference distance information, the reference ephemeris information and the time information.

13. The method of claim 11, wherein said step of determining ephemeris for the space vehicle further comprises propagating ephemeris for the reference spacecraft.

14. The method of claim 11, wherein said step of determining ephemeris for the space vehicle further comprises progagating ephemeris for the space vehicle.

15. The method of claim 1, further comprising obtaining GPS information for the space vehicle, and wherein said step of determining ephemeris for the space vehicle comprises determining ephemeris for the space vehicle further based on the GPS information.

16. The method of claim 1, further comprising determining reference distance information between said space vehicle and at least one natural celestial body, and wherein said step of determining ephemeris for the space vehicle comprises determining ephemeris for the space vehicle further based on the reference distance information.

17. A space vehicle ephemeris determination system comprising:

a processor coupled to a memory, said memory storing ephemeris determination instructions that determine ephemeris using distances to reference spacecraft and reference spacecraft ephemeris data;

a sensor assembly coupled to said processor for determining the distances to reference spacecraft; and a receiver coupled to said processor which receives the reference spacecraft data.

18. The ephemeris determination system of claim 17 wherein the reference spacecraft ephemeris data is crosslinked reference spacecraft ephemeris data.

19. The ephemeris determination system of claim 17 wherein said receiver receives the reference spacecraft ephemeris information from at least one ground station.

20. The ephemeris determination system of claim 17 wherein said sensor assembly comprises a RF communication sensor for determining the distances to reference spacecraft.

21. The ephemeris determination system of claim 19, further comprising a bent-pipe transponder and signal delay measuring apparatus to determine the distances to reference spacecraft.

22. The ephemeris determination system of claim 17, wherein said sensor assembly comprises a RADAR sensor.

23. The ephemeris determination system of claim 17, wherein said sensor assembly comprises an optical sensor.

* * * * *